(12) United States Patent
Kost

(10) Patent No.: US 6,793,154 B2
(45) Date of Patent: Sep. 21, 2004

(54) SPREADER SHIELD

(75) Inventor: James A. Kost, Willoughby, OH (US)

(73) Assignee: The Louis Berkman Company, Steubenville, OH (US)

( * ) Notice: Subject to any disclaimer, the term of this patent is extended or adjusted under 35 U.S.C. 154(b) by 384 days.

(21) Appl. No.: 10/040,825

(22) Filed: Jan. 8, 2002

(65) Prior Publication Data

US 2002/0117562 A1 Aug. 29, 2002

Related U.S. Application Data

(60) Provisional application No. 60/271,916, filed on Feb. 27, 2001.

(51) Int. Cl.[7] ................................................. B05B 1/28
(52) U.S. Cl. .................... 239/288.5; 239/288; 239/650; 239/661; 239/663; 239/666; 239/681
(58) Field of Search ............................... 239/288, 288.3, 239/288.5, 650, 661, 663, 666, 681, 687; 119/57.91

(56) References Cited

U.S. PATENT DOCUMENTS

| 3,171,658 | A | * | 3/1965 | Clark .......................... 239/666 |
| 3,189,355 | A | * | 6/1965 | Swenson et al. ............. 239/687 |
| 3,682,395 | A | * | 8/1972 | Van Der et al. ............. 239/666 |
| 3,819,120 | A | * | 6/1974 | Walker ........................ 239/661 |
| 4,166,581 | A | | 9/1979 | Hetrick |
| 4,549,697 | A | * | 10/1985 | Manon ........................ 239/681 |
| 5,370,321 | A | | 12/1994 | Bianco |
| 5,501,405 | A | * | 3/1996 | Doornek ...................... 239/687 |
| 5,645,228 | A | | 7/1997 | Zwart |
| 5,732,652 | A | * | 3/1998 | Allen ........................ 119/57.91 |
| 6,089,478 | A | * | 7/2000 | Truan et al. ................. 239/661 |
| 6,149,079 | A | * | 11/2000 | Kinkead et al. ............. 239/681 |

* cited by examiner

Primary Examiner—Steven J. Ganey
(74) Attorney, Agent, or Firm—Fay, Sharpe, Fagan, Minnich & McKee, LLP (57) ABSTRACT

A shield for a vehicle mounted spreader device having a hopper and a rotating spreader element beneath the hopper to broadcast particulate material flowing from the hopper onto the spreader element comprises a top wall having an opening for material flowing from the hopper and a side wall extending downwardly from the top wall and circumferentially thereabout between opposite ends spaced apart to provide a discharge opening, and the side wall is arcuate between the opposite ends thereof and eccentric with respect to the opening in the top wall.

49 Claims, 8 Drawing Sheets

SPREADER SHIELD

This application claims the benefit of copending provisional Application Ser. No. 60/271,916, filed Feb. 27, 2001.

BACKGROUND OF THE INVENTION

This invention relates to the art of spreading particulate materials and, more particularly, to an improved spreader shield for such materials.

The spreader shield of the present invention is for use with a spreader which is mountable on a motor vehicle to spread particulate material such as salt, cinders, calcium carbonate, or the like, onto a ground surface such as a roadway. The general configuration and operation of spreaders that the invention is particularly directed to is illustrated in U.S. Pat. No. 4,166,581 to Hetrick, which is incorporated herein by reference. Generally, the vehicle used in association with the spreader includes a rear bumper upon which a spreader can be mounted, as shown in the patent to Hetrick.

In the past, particulate material from vehicle mounted spreaders was dropped onto the top of a rotating spinner element, resulting in the broadcasting of the particulate material rearwardly and laterally of the spreader as intended. However, particulate material dropped onto the rotating element also was directed forwardly and upwardly from the rotating element, and the lateral broadcasting was uncontrolled. These broadcasting patterns are undesirable, potentially resulting in a waste of particulate material, damage to the vehicle and/or components of the spreader, undesired broadcast patterns for the particulate material onto a ground surface, inefficient use of the spreader, and uneconomical consumption of the particulate material. In particular, forward distribution is undesired in that the particulate material is wasted and can damage the rear of the vehicle. In addition, upward distribution is undesired in that the particulate material is deflected off the hopper resulting in a less effective pattern of distribution and potential damage to the hopper. Also, upward distribution of particulate material creates a hazard when trailing or passing motorists are subjected to the particulate material being directed at their automobiles and windshields, potentially damaging both and adversely affecting the motorist's visibility and operation of the vehicle.

Hetrick discloses a moveable baffle with a cylindrical shield. The baffle includes a flat top surface which is fixedly attached to a valve plate with three bolts and wing nuts which are radially inside the shield. In order to adjust the direction of the baffle, each wing nut requires loosening and the baffle subsequently rotated within the defined circumferentially spaced slots. The particulate material that is projected upward results in entrapment between the baffle and the fixed valve plate. In addition, the particulate material is directed toward and against the heads of the bolts. Generally, the particulate material is of a corrosive and abrasive nature, which results in problems with the bolt and wing nut assemblies. As mentioned above, all three of the wing nuts must be loosened in order to rotate the baffle. Loosening of the three wing nuts is cumbersome, particularly considering that the middle wing nut is behind the valve member which limits access thereto. The baffle disclosed in Hetrick is coaxial and concentric with the hopper outlet. The baffle disclosed in Hetrick, including the plurality of circumferentially spaced slots, along with the concentric nature of the baffle, limits the variability of the respective broadcast patterns of the particulate material.

The following patents are incorporated herein by reference as background information: U.S. Pat. No. 5,645,228 to Zwart; and U.S. Pat. No. 5,370,321 to Bianco. These patents relate to human-propelled broadcast spreaders for yard chemicals and wherein the spreader shield is fixedly attached to the hopper or frame of the spreader. One example of a spreader shield of the prior art which attempts to control an undesirable broadcast spreader pattern in a human-propelled broadcast spreader is shown in the patent to Zwart and generally comprises a fixedly attached safety shield to prevent rearward travel of particulate material in order to protect the user against particulate blow-back. The shield is fixedly attached to the tubular frame at the rear of the spreader and, once attached, the shield remains in a fixed position to deflect particulate material from impinging upon the operator. The shield in Zwart is not associated with controlling the desired pattern or spread of the material being discharged. In the patent to Bianco, a shield is secured to the hopper of the spreader and comprises inclined plates for deflecting particulate material as it is scattered by the spreader to prevent material from being scattered outside a selected zone of application. Bianco's shield, however, does not allow adjustment of the shield to control the direction or pattern of discharge of the material. Consequently, there remains a need for a spreader shield to be used with a spreader mountable on a motor vehicle which overcomes the aforementioned problems and limitations.

SUMMARY OF THE INVENTION

The present invention provides an improved spreader shield which overcomes the above referred-to difficulties and others with regard to such shields heretofore available. The present invention has fewer component parts, is less cumbersome to operate, is more functional, and is easier to use than prior art devices. More particularly in this respect, a spreader shield in accordance with the invention has improved controllability with respect to directing the particulate material discharged from a rotating spreader element onto a desired area of the underlying ground surface. The spreader shield also reduces the amount of particulate material that is directed toward undesired locations around the spreader relative to shields heretofore available. The present invention is comprised of a pivotable shield that is structured and adjustable such as to enable improved selective directing of the particulate material relative to a street or the like. The adjustment of the particulate material discharge of the spreader shield occurs due to an eccentric configuration of the shield relative to the axis of rotation of the spreader element. Due to the rotational movement of the eccentric shield about the axis of the spreader element, the spreader shield can be moved so as to adjust the resultant broadcast pattern of the particulate material to any one of a number of different patterns. Combining the rotational movement of the shield with the particular configuration of the spreader shield allows specific and concentrated particulate material discharge patterns. These patterns can be directed in the desired direction such that the discharge patterns are generally to the right of the vehicle, directly behind the vehicle, or generally to the left of the vehicle. The spreader shield facilitates changing broadcast spreader patterns by its ability to rotate about the discharge axis of the hopper.

In accordance with one aspect of the invention, the spreader shield has a peripheral wall which is eccentric with respect to the discharge axis of the hopper, which enhances the adjustment characteristics of the discharge of the particulate material and also allows additional variations to the particulate discharge spreader patterns. The eccentricity between the shield and the discharge axis of the hopper enables asymmetrical distribution of particulate material about the discharge axis. The asymmetrical distribution provides improved broadcast patterns and control thereof relative to the vehicle.

In accordance with another aspect of the invention, a spreader shield has a top wall which is inclined and positioned over the spreader element, thus minimizing, if not eliminating, upward distribution of particulate material. The configuration of the spreader shield improves directional control of both lateral and downward broadcasting of the particulate material from the spreader element onto the ground surface. In part in this respect, a spreader shield in accordance with the invention is mounted in an improved manner that allows the shield to be easily adjusted and oriented such that the controlled direction and pattern of the particulate material from the spreader is enhanced. Further in this respect, a spreader shield according to the invention is adapted to be releasably held in an adjusted position by arrangements which advantageously avoid the exposure of threaded fasteners and the components of other positioning arrangements to direct impact with the particulate material being distributed. Importantly in this respect, the shield's position is adjusted by arrangements that are not in the path of the discharged particulate material.

It is accordingly an outstanding object of the invention to provide an improved spreader shield for a vehicle mounted particulate material spreader in which the shield controls the direction at which the particulate material is discharged.

Another object of the invention is the provision of an improved spreader shield of the foregoing character that allows the shield to be easily manipulated relative to the particulate material hopper such that the direction of the particulate material can be altered.

A further object of the invention is the provision of an improved spreader shield of the foregoing character which is pivotally mounted coaxial with the discharge axis of the hopper while having an outer periphery which is eccentric with respect to the discharge axis, thus to enable improved control with respect to the pattern of discharge of the particulate material.

Yet another object is the provision of a spreader shield of the foregoing character having improved arrangements for maintaining the shield in an adjusted position relative to the discharge hopper.

Still a further object of the invention is the provision of a spreader shield of the foregoing character which is simple in construction, economical to manufacture, durable, and easy to use.

Yet a further object is the provision of a spreader shield of the foregoing character which is efficient in use and promotes a more economical consumption of particulate material than heretofore possible.

BRIEF DESCRIPTION OF THE DRAWINGS

The foregoing and other objects and advantages will in part be obvious and in part pointed out in the following description taken together with the accompanying drawings in which:

FIG. 1 is a pictoral view of a spreader illustrating a preferred embodiment of a spreader shield according to the present invention;

FIG. 2 is an enlarged rear elevation view showing details of the spreader and shield;

FIG. 3 is an enlarged side elevation view of the spreader and shield;

FIG. 4 is an exploded, perspective view of the spreader and shield;

FIG. 5 is a plan view of the spreader shield taken along line 5—5 in FIG. 2;

FIG. 6 is a sectional elevation view of the spreader shield taken along line 6—6 in FIG. 5;

FIG. 7 is a perspective view of the spreader shield;

FIG. 8 is a sectional elevation view of another embodiment of a spreader shield in accordance with the invention;

FIG. 9 is a plan view of another embodiment of a spreader shield in accordance with the invention;

FIG. 10 is an elevation view of the spreader shield shown in FIG. 9;

FIG. 11 is a plan view of yet another embodiment of a spreader shield in accordance with the present invention; and, FIG. 12 is an elevation view, partially in section, of the spreader shield shown in FIG. 11.

DESCRIPTION OF PREFERRED EMBODIMENTS OF THE INVENTION

Referring now in greater detail to the drawings, wherein the showings are for the purpose of illustrating preferred embodiments of the invention only, and not for the purpose of limiting the invention, a spreader A, as best seen in FIGS. 1–4, is mountable upon a motor vehicle B for spreading particulate material, such as salt or cinders, onto a roadway C. For illustrative purposes, roadway C terminates in a curb D separating roadway C from a pedestrian walkway, not shown. Vehicle B includes a bed 10 having a rear bumper 12. In the illustrated embodiment, a mounting frame structure 16 is provided on vehicle B for supporting spreader A. Mounting structure 16 is used to secure the valving mechanism and drive mechanism for spreader A in operable relationship with a hopper 20, which receives particulate material to be distributed from spreader A. As shown in FIGS. 2–4, hopper 20 has a somewhat standard design and is constructed to provide an appropriate receptacle for particulate material and an arrangement for funneling the particulate material toward the underlying rotating spreader element 32 of spreader A. In this respect, hopper 20 includes a tapered bottom chute 24 terminating in a generally cylindrical discharge sleeve 26 having a lower generally circular discharge opening 28 and an outer cylindrical surface 30. Material placed within hopper 20 is fed through tapered bottom chute 24 to discharge sleeve 26 from which it can be discharged through discharge opening 28. Since hopper 20 is supported on mounting frame 16, the position of discharge sleeve 26 is fixed by frame 16 and the mechanism for securing hopper 20 onto the frame.

Rotatable spreader element 32, best shown in FIGS. 2 and 4, may take a variety of structural forms. In the illustrated embodiment, spreader element 32 includes a centrally apertured circular plate 34, a center hub 36 mounted therebeneath, and four evenly spaced, radially extending vanes 38 on the upper side thereof. A fixed motor mounting plate 40 is supported on frame 16 by straps 41 and 43 and includes an opening 44 generally concentric with discharge opening 28. Motor M is secured to the underside of mounting plate 40 by fasteners 45 so that the axis a of the motor drive shaft 42 extends vertically through opening 44. Hub 36 of spreader element 32 receives shaft 42 and is secured thereto such as by a set screw 37. Particulate material to be spread is placed within hopper 20, and the rotation of motor M is operable through a shaft extension 42*a* of shaft 42 coupled with an agitator in the hopper, not shown, to cause the particulate material to flow through opening 28 onto rotating spreader element 32. From spreader element 32, the particulate material is centrifugally propelled outwardly, for example, onto roadway C along which vehicle B is traveling. As so far explained, spreader A is somewhat standard in design and operation.

In accordance with one aspect of the present invention, there is provided a novel spreader shield 46 for directing the particulate material. As best seen in FIGS. 4–7, shield 46 is generally semicircular and comprises a top wall 50 which tapers outwardly and downwardly from a circular collar 52 and which has a periphery defined by a semicircular front wall 54 extending downwardly therefrom and a rear edge comprising an arcuate portion 56 radially outwardly of collar 52 and linear, radially extending edges 58 and 60 between edge 56 and wall 54. Wall 54 terminates in opposite ends defined by vertical edges 62 and 64 which respectively intersect with edges 58 and 60. Edges 62 and 64 are circumferentially spaced apart to provide a discharge opening 63 therebetween, and edge 62 is closer to axis a than is the other edge 64. The lower end of wall 54 terminates in a radially outwardly extending lip 53 which includes a flange 55 adjacent edge 62 of wall 54 for the purpose set forth hereinafter. The shield 46 may be formed from any number of impact resistant plastic materials, for example, high density polyethylene. Collar 52 defines an opening 72 which receives discharge sleeve 26 of hopper 20. The interengagement between opening 72 and outer cylindrical surface 30 of sleeve 26 allows shield 46 to rotate about axis a.

Figure 1:
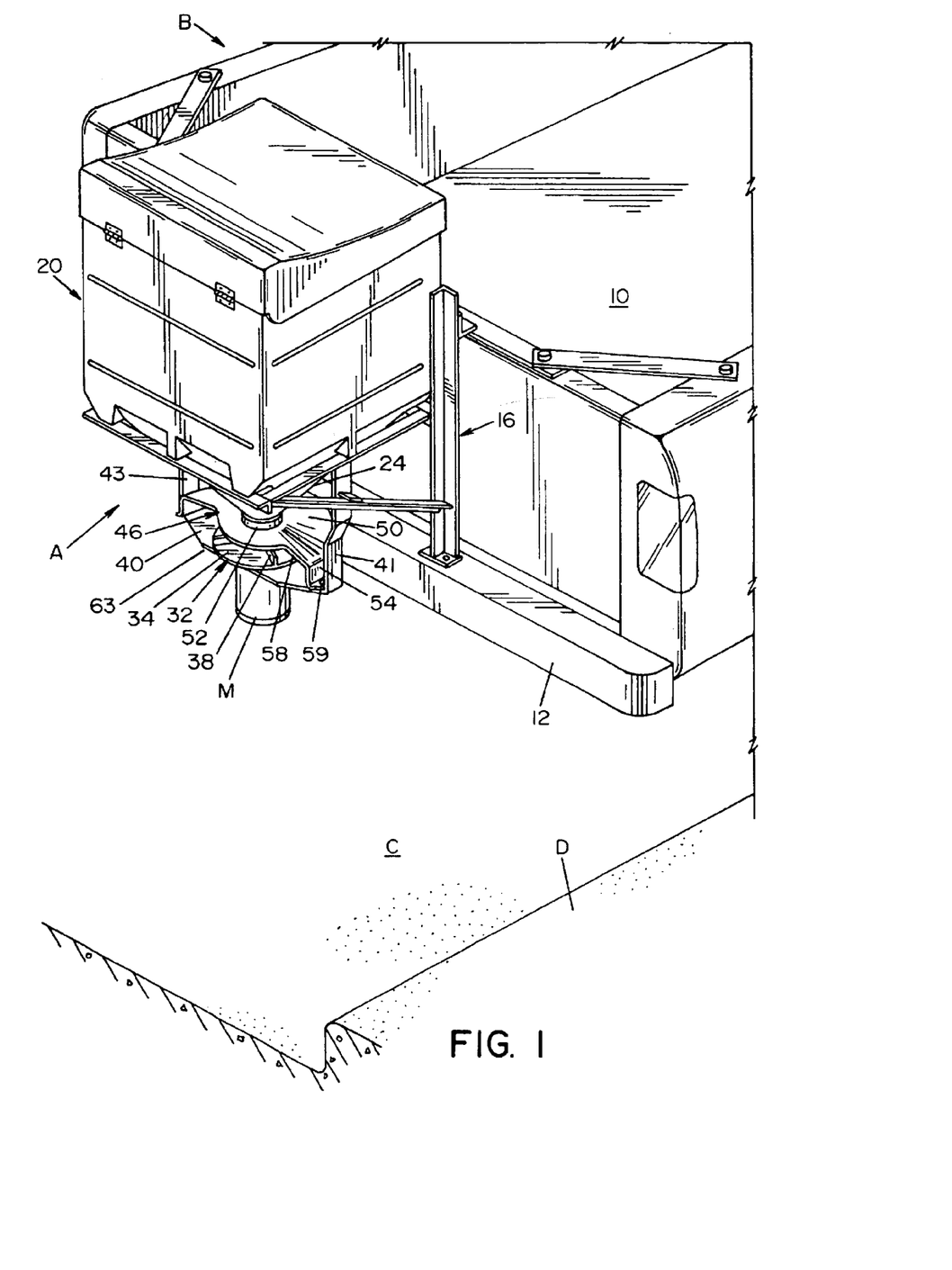
Figure 2:
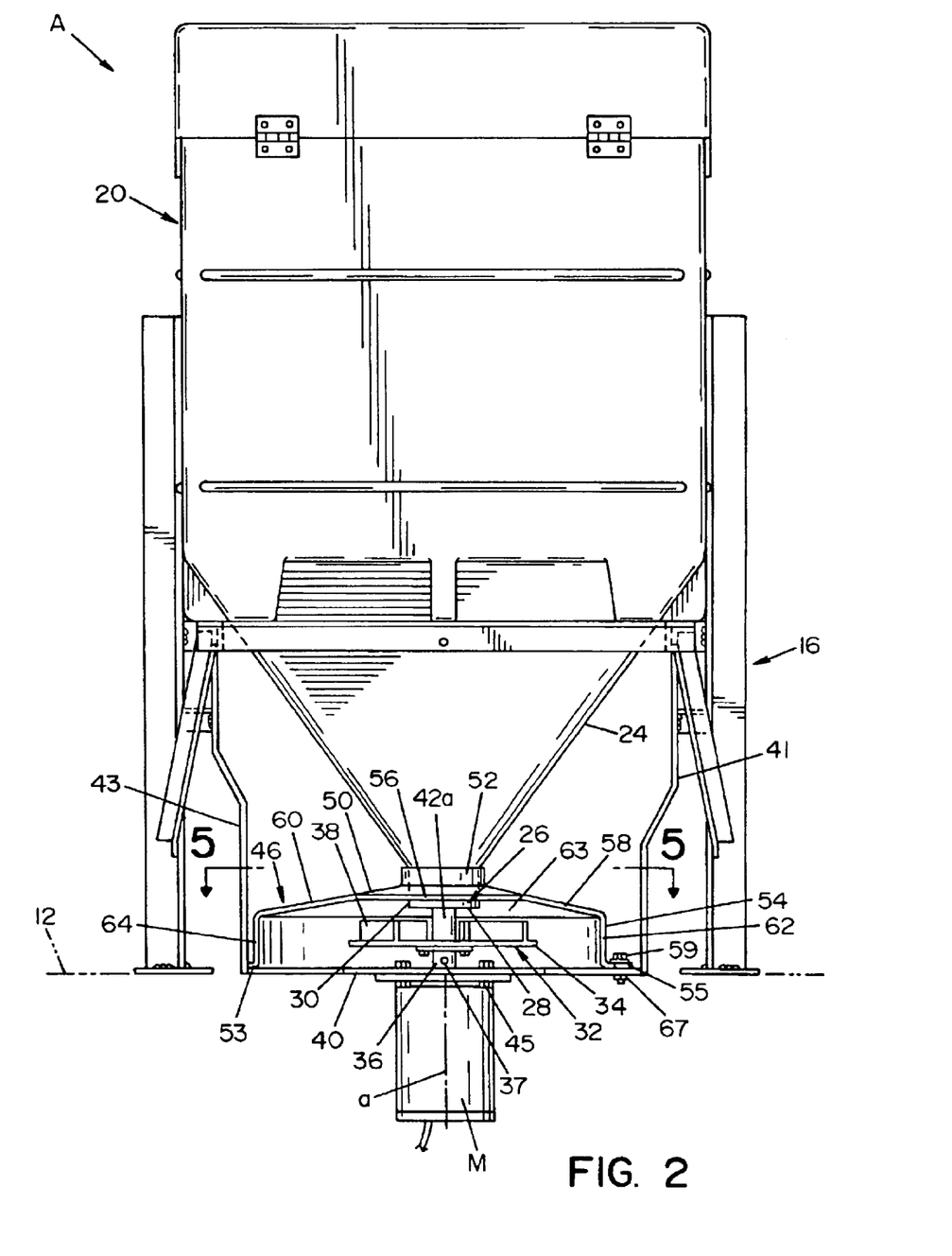
Figure 3:
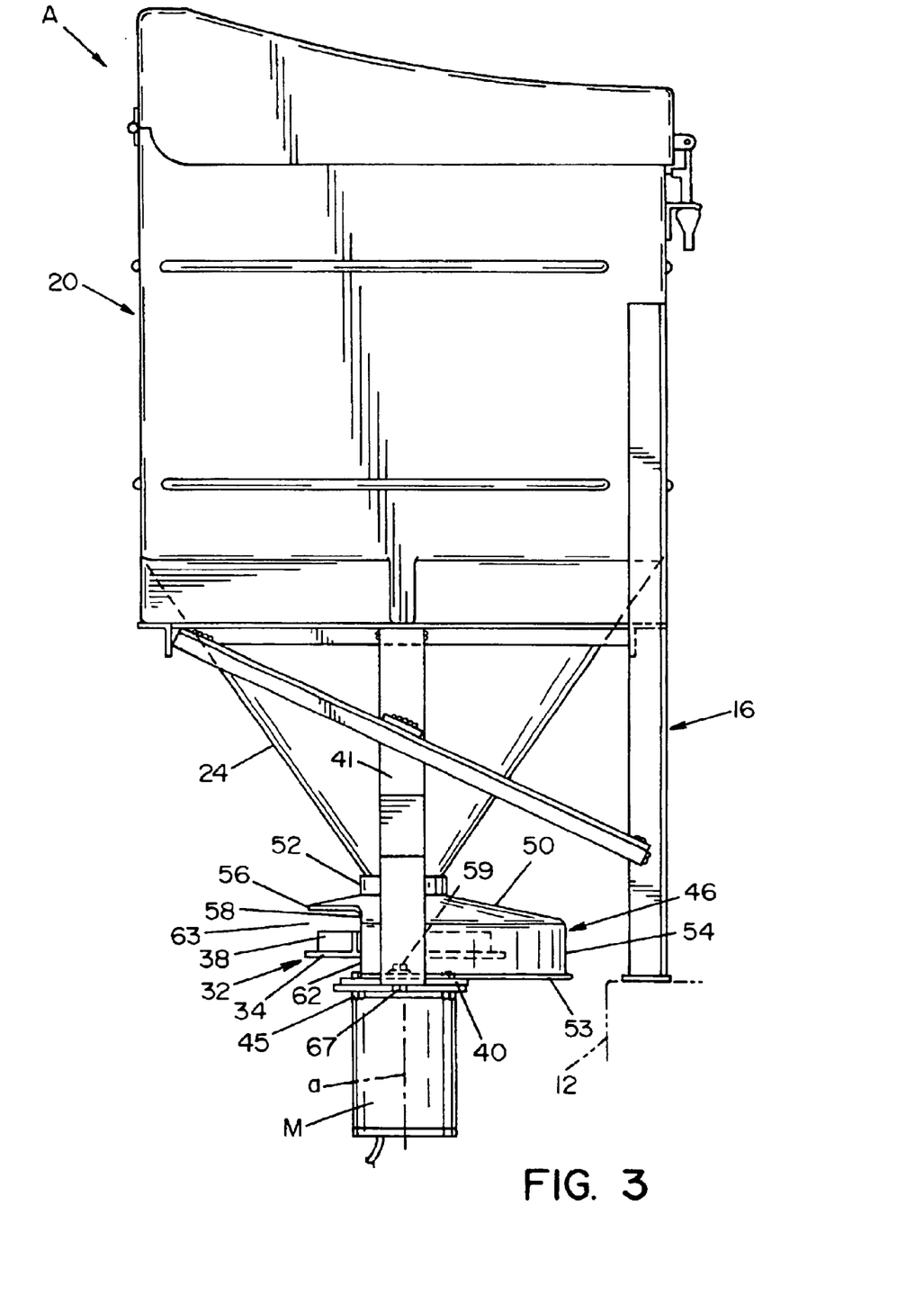
Figure 4:
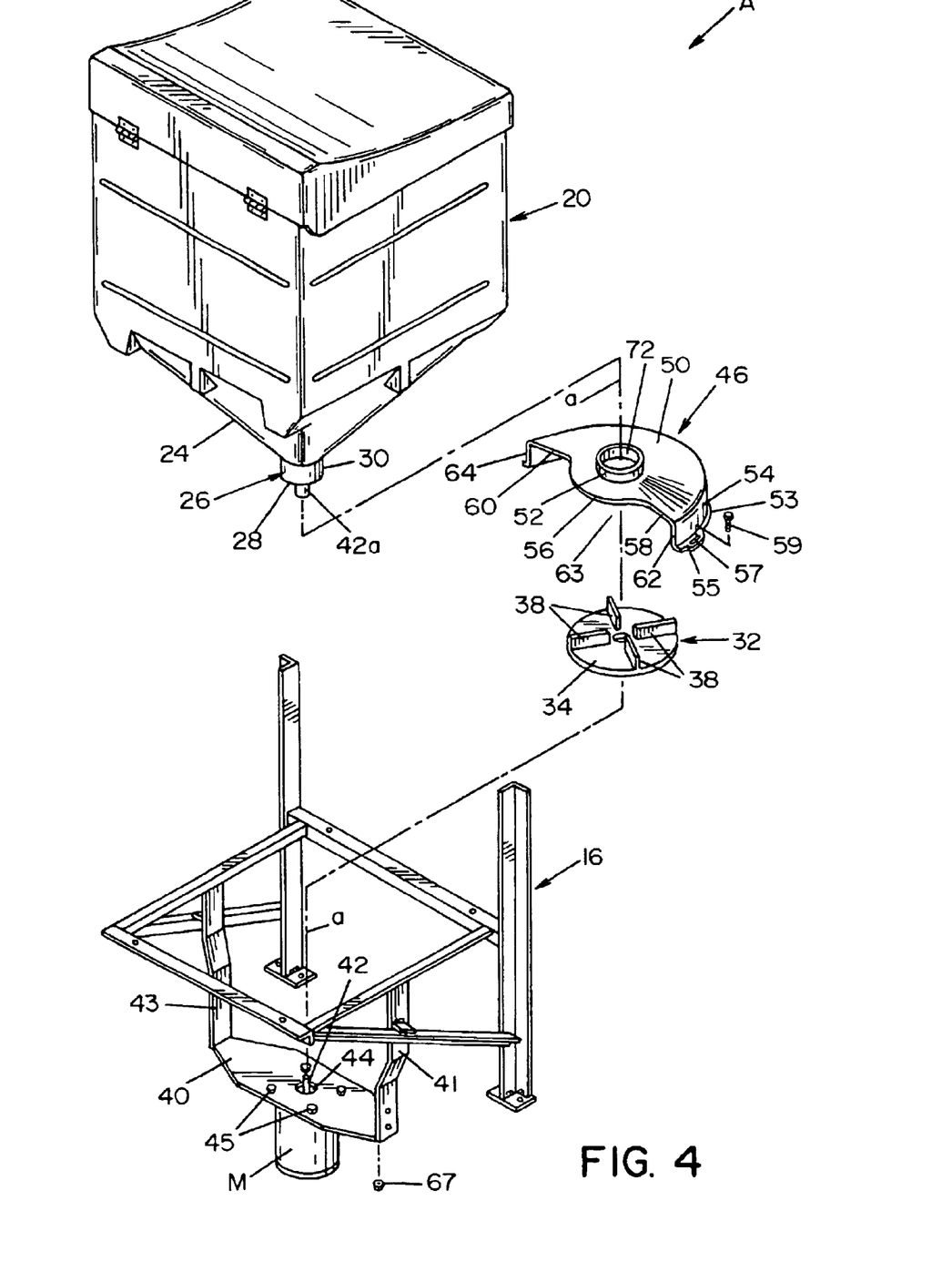
Figure 5:
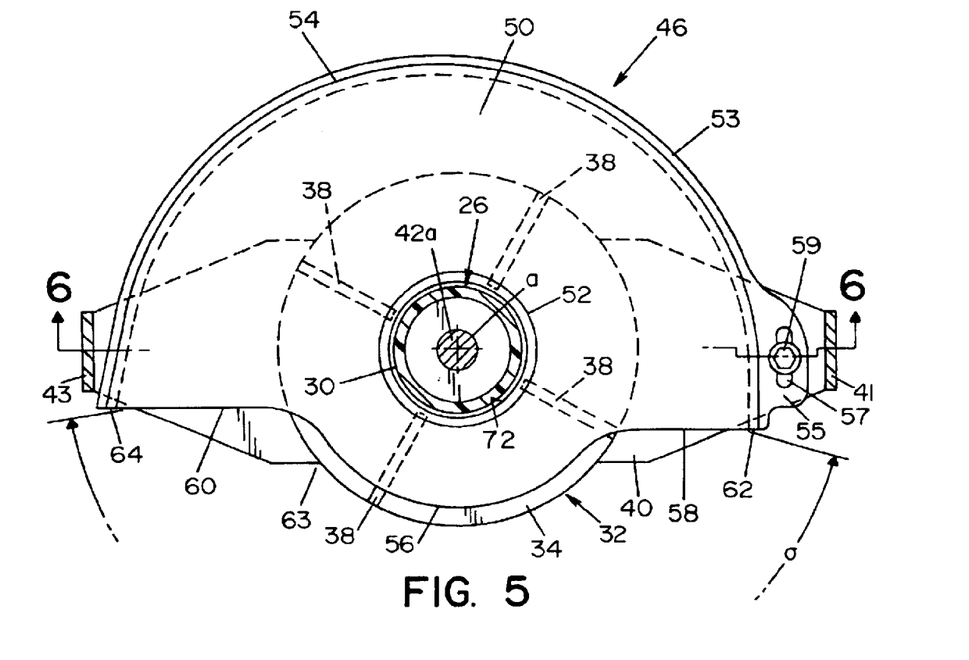
Figure 6:
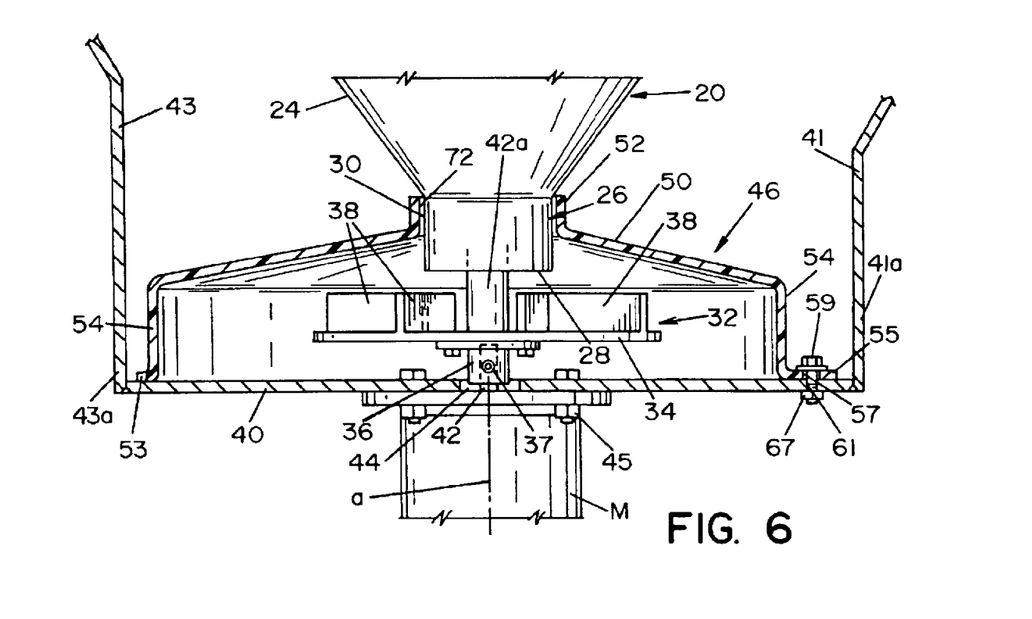

As shown in FIGS. 5 and 6, collar 52 of shield 46 is coaxial with axis a and motor drive shaft 42, and flange 55 is provided with a circumferentially extending slot 57 for receiving a bolt 59. Bolt 59 passes through a corresponding opening 61 in mounting plate 40 and receives a nut 67 for securing shield 46 in variable fixed positions about axis a. The flange 55, slot 57, and bolt 59 in being outward from wall 54 advantageously are protected from direct contact with discharged particulate material. It will be appreciated, as described hereinafter, that other mechanisms can be employed to limit and fix the position of shield 46 which are not contacted by discharged particulate material. In the manner shown in FIGS. 5 and 6, shield 46 has a limited rotational movement, defined by the length of slot 57, about motor drive shaft 42 for directional adjustment of the pattern of discharge of particulate material. It will be appreciated that flange 55 and slot 57 can be extended further about the lower lip 53 of wall 54 to enable increased rotational movement. Moreover, it will be appreciated that the slot can be provided in mounting plate 40 and that the opening for the bolt can be in flange 55. Still further, it will be appreciated that in either instance, nut 67 can be a wing nut.

Collar 52 of shield 46 is coaxial with axis a and motor drive shaft 42. Shield 46 is pivotal about surface 30 of hopper 20, and lip 53 of wall 54 rests upon mounting plate 40. In this manner, shield 46 can be rotated about drive shaft 42 for directional adjustment of discharge opening 63 and thus of the pattern of discharge of the particulate material. As best seen in FIG. 5, wall 54 of shield 46 is eccentric with respect to axis a and thus discharge sleeve 26 and spreader element 32. Accordingly, the particulate material passing through discharge opening 28 falls centrally upon rotatable spreader element 32, and vanes 38 thereon propel the particulate material outward beyond the circumference of plate 34 and against wall 54, whereby the latter controls the directional discharge of the particulate material laterally of axis a. Further, top wall 50 prevents propelling of the particulate material upwardly against chute 24 of hopper 20, and peripheral wall 54 prevents the particulate material from spreading forwardly toward vehicle B. Importantly, wall 54 and the eccentricity thereof with respect to axis a provides for the material to spread rearwardly and laterally of vehicle B in a spread pattern generally defined by angle σ of discharge opening 63 which is slightly less than 180°. As will be appreciated from FIG. 5, the eccentric wall arrangement results in spreading particulate material further to the left from center, as defined by a center line rearwardly through axis a, than to the right of center. This advantageously enables, for example, casting more of the material into the street than toward the sidewalk. Thus, the resultant discharge enhances distribution onto desired surface areas while simultaneously preventing undesirable distribution. The orientation of discharge opening 63 can be adjusted by rotating shield 46 about sleeve 26 of hopper 20. As will be appreciated from FIG. 5, the spreading angle σ and corresponding direction of discharge of particulate material is created by the eccentric character of wall 54 relative to axis a. In this respect, a line through axis a and edge 64 of wall 54 is at a greater angle to center than is a line through axis a and edge 62 of the wall. The spreading angle a of discharge opening 63 is between 140° and 160° and, preferably, is about 153°. Thus, it will be appreciated that rotation of shield 46 in opposite directions about axis a enables manipulation of the spreading angle σ in order to direct the particulate material over any number of different patterns as may be desired in connection with given situations. The angular displacement of shield 46 is limited by the circumferential distance between the opposite ends of slot 57 in flange 55 which can be of any desired dimension.

FIG. 8 illustrates another embodiment of a spreader shield positioning arrangement according to the present invention and in which the same reference numerals as appear in FIGS. 5–7 designate the same elements and parts. As in the preceding embodiment, collar 52 of shield 46 is coaxial with axis a and motor drive shaft 42, and shield 46 is pivotal about surface 30 of sleeve 26. In this embodiment, lip 53 is eliminated from the bottom of wall 54, and the bottom edge 65 of wall 54 rests upon mounting plate 40. In this manner, shield 46 can be rotated about motor drive shaft 42 for directional adjustment of the pattern of discharge of the particulate material. Further in accordance with this embodiment, as seen in FIG. 8, the end of wall 54 adjacent edge 64 thereof frictionally interengages with the lower end **43*a* of strap 43, and the end adjacent edge 62 frictionally engages with an upwardly extending leg 74 of an angle iron component 76 mounted on plate 40 at lower end 41*a* of strap 41. It will be appreciated that the frictional interengagement is sufficient to hold shield 46** in a given position of adjustment relative to axis a.

FIGS. 9 and 10 illustrate another embodiment of a spreader shield positioning arrangement according to the present invention and in which the same reference numerals as appear in FIGS. 5–7 designate the same elements and parts. FIGS. 9 and 10 illustrate a spreader shield 86 which includes a top wall 88 and a peripheral wall 96. The peripheral wall 96 is concentric with respect to axis a and includes a plurality of stops 90. The stops 90 are in the form of plastic posts attached to the wall 96 such as by plastic welding. Each stop 90 extends below wall 96 and is adapted to abut against the front edge **40*a* of mounting plate 40, thereby limiting rotation of shield 86 in opposite directions about axis a. Stops 90, by limiting rotation, enable adjustable positioning of shield 86 within fixed limits. It will be appreciated that stops 90 can also be used in the eccentric configuration of the shield in the embodiment of FIGS. 1 through 8**.

Figure 7:
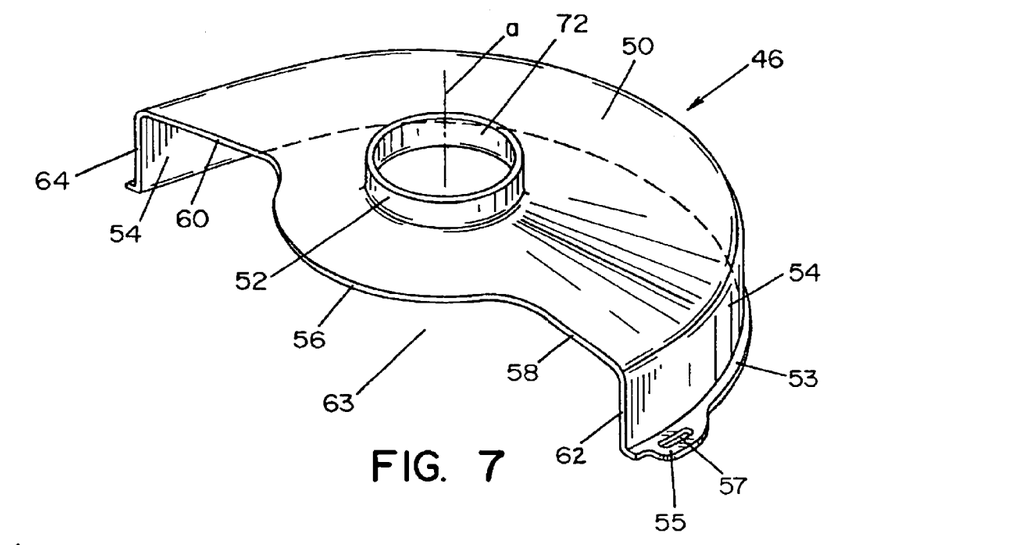
Figure 8:
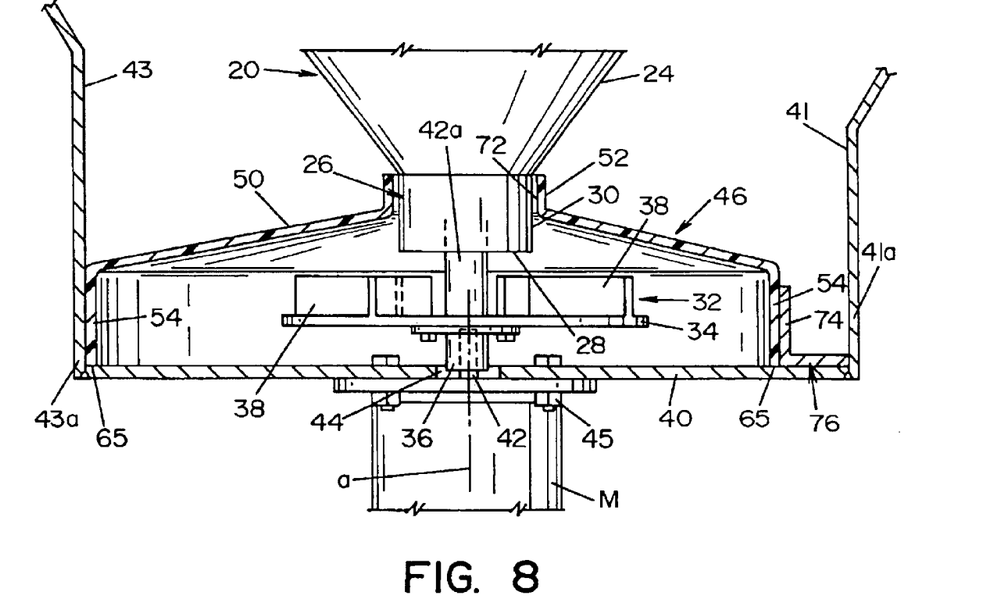
Figure 9:
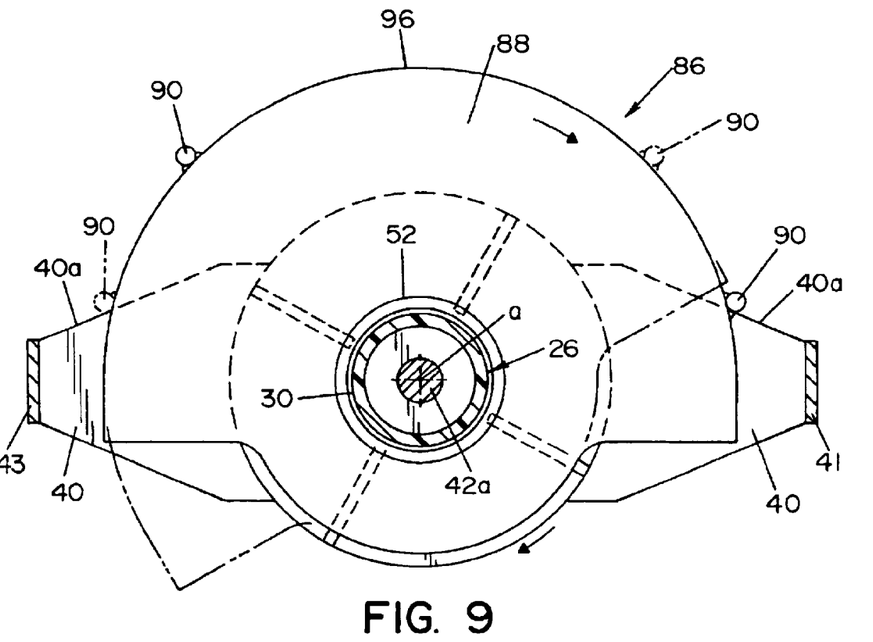
Figure 10:
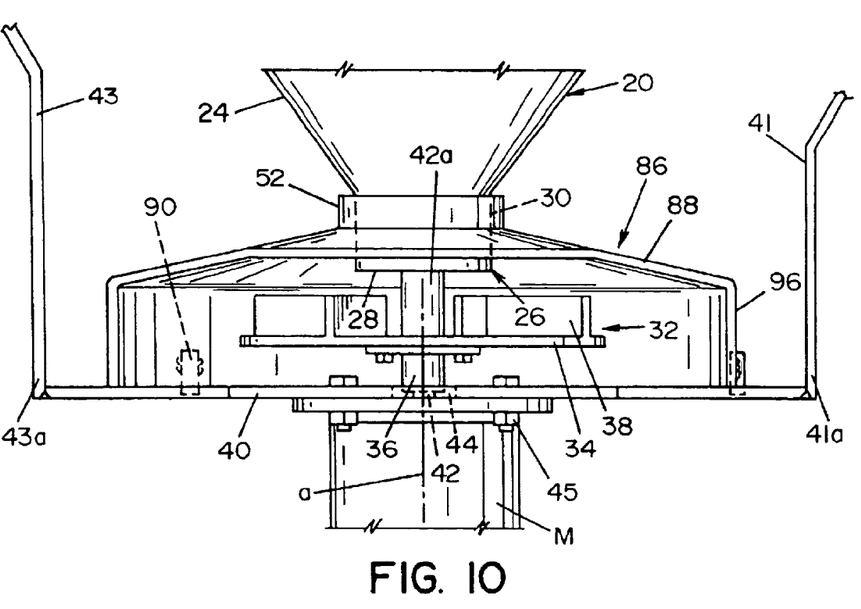
Figure 11:
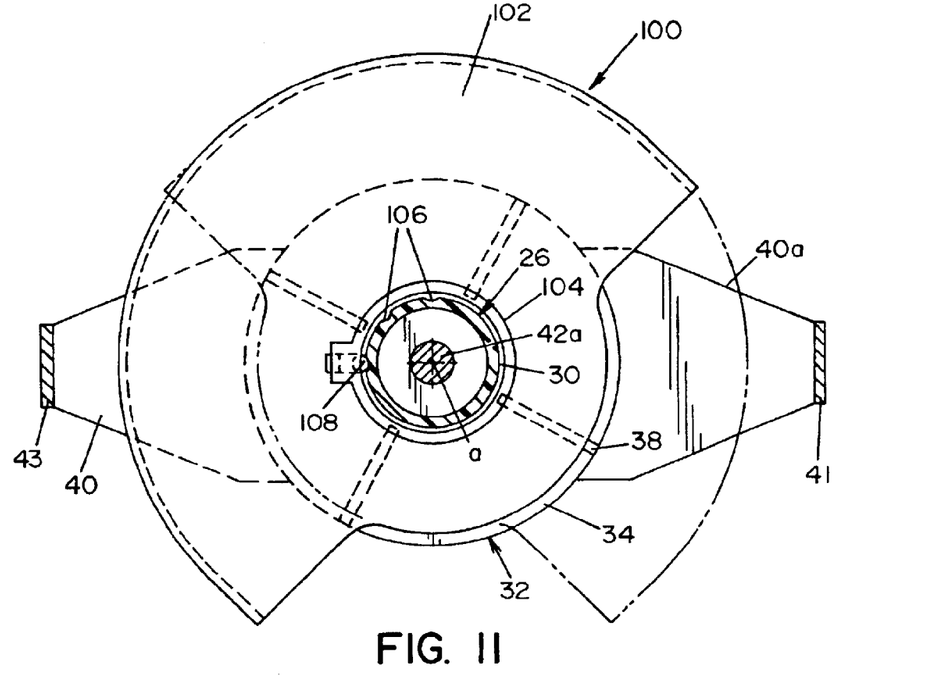
Figure 12:
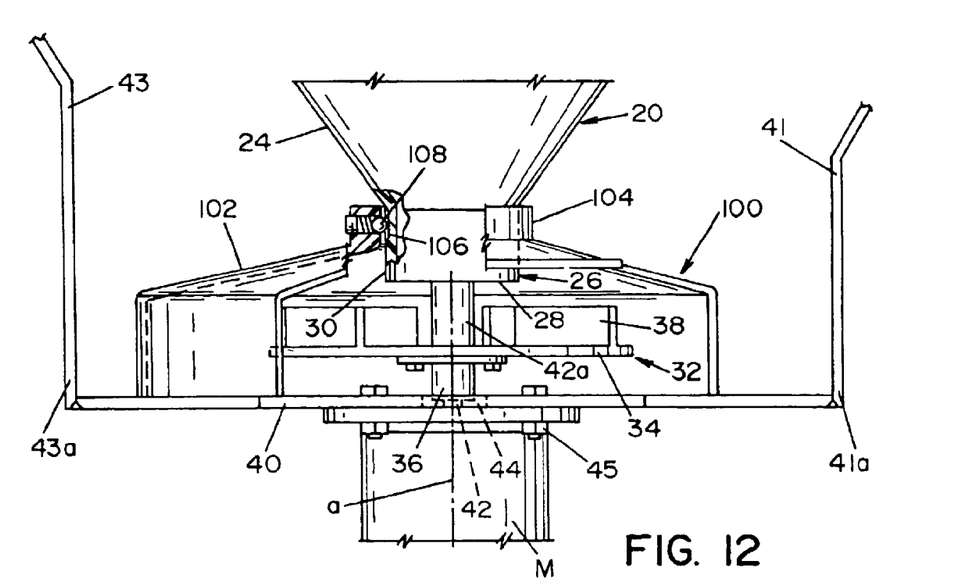

FIGS. 11 and 12 illustrate another spreader shield positioning arrangement according to the present invention and in which the same reference numerals as appear in FIGS. 5–7 designate the same elements and parts. In accordance with this embodiment, a generally semicircular shield 100 has a top wall 102 provided with a circular collar 104 which receives discharge sleeve 26 of hopper 20. The outer surface of sleeve 26 includes a plurality of detent recesses 106 spaced apart circumferentially thereon, and collar 104 is provided with a spring biased ball detent 108 for mating engagement with recesses 106. The detent arrangement provides for the selective positioning of shield 100 about axis a within the angular limits defined by the spacing between the endmost ones of the recesses 106. The detent arrangement allows selective orientation of shield 100 which enables multiple fixed positions of the shield 100 and corresponding control of the particulate material. While shield 100 is coaxial and concentrical with axis a, it will be appreciated that the selective positioning of shield 100 as shown in FIGS. 11 and 12 can be used in connection with the embodiment of FIGS. 1 through 8.

The invention has been described with reference to preferred and alternate embodiments. Modifications and alterations will become apparent to those skilled in the art upon reading and understanding the detailed description of the invention provided for herein. This invention is intended to include all such modifications and alterations insofar as they come within the scope of the present invention.

Having thus described the invention, it is claimed:

1. A shield in association with a vehicle mounted spreader element comprising a wall radially spaced from and extending eccentrically about an axis, said wall having opposite ends circumferentially spaced apart to provide a discharge opening therebetween, said wall is a side wall and said shield includes a top wall from which said side wall depends, said top wall including an arcuate edge further defining said discharge opening.

2. The shield according to claim 1, wherein said top wall further includes an opening coaxial with said axis, and said shield is rotatable in opposite directions about said axis.

3. The shield according to claim 1, wherein said wall extends below the spreader element and a support includes means underlying said wall for supporting said wall relative to the spreader element.

4. The shield according to claim 3, wherein said said top wall further includes a circular collar coaxial with said axis.

5. A shield for a vehicle mounted spreader comprising a support, a hopper for particulate material on said support, and a rotatable spreader element beneath said hopper for broadcasting particulate material flowing thereonto from said hopper, said spreader element having an axis, said shield comprising a wall radially spaced from and extending eccentrically about said axis, said wall having opposite ends circumferentially spaced apart to provide a discharge opening therebetween, and means for supporting said wall relative to said spreader element, said wall is a side wall and said shield includes a too wall from which said side wall depends, said top wall including an opening coaxial with said axis, said top wall tapers outwardly and downwardly relative to said axis.

6. A shield for a vehicle mounted spreader comprising a support, a hopper for particulate material on said support, and a rotatable spreader element beneath said hopper for broadcasting particulate material flowing thereonto from said hopper, said spreader element having an axis, said shield comprising a wall radially spaced from and extending eccentrically about said axis, said wall having opposite ends circumferentially spaced apart to provide a discharge opening therebetween, and means for supporting said wall relative to said spreader element, said wall is rotatable in opposite directions about said axis, and means for selectively positioning said discharge opening in any one of a plurality of positions about said axis.

7. The shield according to claim 6, wherein said wall includes a laterally outwardly extending flange, and said means for positioning said discharge opening includes means interengaging said flange and said support for limiting rotation of said wall.

8. The shield according to claim 7, wherein said means interengaging said flange and said support includes a circumferentially extending slot in one of said flange and support and fastener means on the other of said flange and support.

9. The shield according to claim 6, wherein said wall has a lower edge and includes a pair of circumferentially spaced apart stop elements extending below said edge, and said support includes an abutment for engaging with each stop element to limit rotation of said wall.

10. The shield according to claim 6, wherein said hopper includes a discharge sleeve, said wall is a side wall and said shield includes a top wall from which said side wall depends, said top wall including a circular collar coaxial with said axis and receiving said sleeve, and means interengaging said sleeve and said collar in any one of a plurality of angular positions therebetween.

11. The shield according to claim 10, wherein said means interengaging said sleeve and collar includes a spring biased ball on one of said collar and said sleeve and a plurality of circumferentially adjacent recesses on the other of said collar and sleeve.

12. The shield according to claim 11, wherein said spring biased ball is on said collar.

13. A shield in association with a vehicle mounted spreader element and a hopper comprising a top wall spaced above the spreader element, an opening in said top wall for material flowing from the hopper to the spreader element, said opening having an axis, a side wall extending downwardly from said top wall and peripherally thereabout between opposite ends circumferentially spaced apart to provide a discharge opening therebetween, said top wall includes a rear edge having an arcuate portion further defining said discharge opening, and said side wall being eccentric with respect to said axis.

14. The shield according to claim 13, wherein said shield is rotatable in opposite directions about said axis, and means for selectively positioning said discharge opening in any one of a plurality of positions about said axis.

15. The shield according to claim 13, wherein said side wall extends below the spreader element and a support includes means underlying said wall for supporting said shield relative to the spreader element.

16. The shield according to claim 15, wherein and said top wall further includes a circular collar coaxial with said axis.

17. The shield according to claim 16, wherein said discharge opening has an angular extent of between 140° and 160° with respect to said axis.

18. The shield according to claim 17, wherein said angular extent is about 153°.

19. The shield according to claim 16, wherein said wall is arcuate between said opposite ends and one of said opposite ends is closer to said axis than the other.

20. The shield according to claim 16, wherein said shield is rotatable in opposite directions about said axis, and means for selectively positioning said discharge opening in any one of a plurality of positions about said axis.

21. The shield according to claim 20, wherein said shield is constructed from high density polyethylene.

22. The shield according to claim 13, wherein said shield is constructed from high density polyethylene.

23. A shield for a vehicle mounted spreader comprising a support, a hopper for particulate material on said support, and a rotatable spreader element beneath said hopper for broadcasting particulate material flowing thereonto from said hopper, said shield comprising a top wall spaced above said spreader element, an opening in said top wall for material flowing from said hopper to said spreader element, said opening having an axis, a side wall extending downwardly from said top wall and peripherally thereabout between opposite ends circumferentially spaced apart to provide a discharge opening therebetween, and said side wall being eccentric with respect to said axis, said top wall tapers outwardly and downwardly relative to said axis from said opening to said side wall.

24. A shield for a vehicle mounted spreader comprising a support, a hopper for particulate material on said support, and a rotatable spreader element beneath said hopper for broadcasting particulate material flowing thereonto from said hopper, said shield comprising a top wall spaced above said spreader element, an opening in said top wall for material flowing from said hopper to said spreader element, said opening having an axis, a side wall extending downwardly from said top wall and peripherally thereabout between opposite ends circumferentially spaced apart to provide a discharge opening therebetween, and said side wall being eccentric with respect to said axis, said shield is rotatable in opposite directions about said axis, and means for selectively positioning said discharge opening in any one of a plurality of positions about said axis, said side wall has a lower edge and includes a laterally outwardly extending flange, and said means for positioning said discharge opening includes means interengaging said flange and said support for limiting rotation of said shield.

25. The shield according to claim 24, wherein said means interengaging said flange and said support includes a circumferentially extending slot in said flange and fastener means on said support.

26. A shield for a vehicle mounted spreader comprising a support, a hopper for particulate material on said support, and a rotatable spreader element beneath said hopper for broadcasting particulate material flowing thereonto from said hopper, said shield comprising a top wall spaced above said spreader element, an opening in said top wall for material flowing from said hopper to said spreader element, said opening having an axis, a side wall extending downwardly from said top wall and peripherally thereabout between opposite ends circumferentially spaced apart to provide a discharge opening therebetween, and said side wall being eccentric with respect to said axis, said shield is rotatable in opposite directions about said axis, and means for selectively positioning said discharge opening in any one of a plurality of positions about said axis, said wall has a lower edge and includes a pair of circumferentially spaced apart stop elements extending below said edge, and said support includes an abutment for engaging with each stop element to limit rotation of said shield.

27. A shield for a vehicle mounted spreader comprising a support, a hopper for particulate material on said support, and a rotatable spreader element beneath said hopper for broadcasting particulate material flowing thereonto from said hopper, said shield comprising a top wall spaced above said spreader element, an opening in said top wall for material flowing from said hopper to said spreader element, said opening having an axis, a side wall extending downwardly from said top wall and peripherally thereabout between opposite ends circumferentially spaced apart to provide a discharge opening therebetween, and said side wall being eccentric with respect to said axis, said shield is rotatable in opposite directions about said axis, and means for selectively positioning said discharge opening in any one of a plurality of positions about said axis, said hopper includes a discharge sleeve and said top wall includes a circular collar coaxial with said axis and receiving said sleeve, and means interengaging said sleeve and said collar in any one of a plurality of angular positions therebetween.

28. The shield according to claim 27, wherein said means interengaging said sleeve and collar includes a spring biased ball on one of said collar and said sleeve and a plurality of circumferentially adjacent recesses on the other of said collar and sleeve.

29. The shield according to claim 28, wherein said spring biased bail is on said collar.

30. The shield according to claim 29, wherein said top wall slopes outwardly and downwardly from said opening to said side wall.

31. A shield for a vehicle mounted spreader comprising a support, a hopper for particulate material on said support, and a rotatable spreader element beneath said hopper for broadcasting particulate material flowing thereonto from said hopper, said shield comprising a top wall spaced above said spreader element, an opening in said too wall for material flowing from said hopper to said spreader element, said opening having an axis, a side wall extending downwardly from said top wall and peripherally thereabout between opposite ends circumferentially spaced apart to provide a discharge opening therebetween, and said side wall being eccentric with respect to said axis, said side wall extends below said spreader element and said support includes means underlying said wall for supporting said shield relative to said spreader element, said hopper includes a discharge sleeve and said too wall includes a circular collar coaxial with said axis and receiving said sleeve, said shield is rotatable in opposite directions about said axis, and means for selectively positioning said discharge opening in any one of a plurality of positions about said axis, said side wall has a lower edge and includes a laterally outwardly extending flange, and said means for positioning said discharge opening includes means interengaging said flange and said support for limiting rotation of said shield.

32. The shield according to claim 31, wherein said means interengaging said flange and said support includes a circumferentially extending slot in said flange and fastener means on said support.

33. A shield for a vehicle mounted spreader comprising a support, a hopper for particulate material on said support, and a rotatable spreader element beneath said hopper for broadcasting particulate material flowing thereonto from said hopper, said shield comprising a top wall spaced above said spreader element, an opening in said top wall for material flowing from said hopper to said spreader element, said opening having an axis, a side wall extending downwardly from said top wall and peripherally thereabout between opposite ends circumferentially spaced apart to provide a discharge opening therebetween, said shield being rotatable in opposite directions about said axis, and means for selectively positioning said discharge opening in any one of a plurality of positions about said axis, said side wall has a lower edge and includes a laterally outwardly extending flange, and said means for positioning said discharge opening includes means interengaging said flange and said support for limiting rotation of said shield.

34. The shield according to claim 33, wherein said means interengaging said flange and said support includes a circumferentially extending slot in one of said flange and support and fastener means on the other of said flange and support.

35. The shield according to claim 34, wherein said slot is in said flange.

36. A shield for a vehicle mounted spreader comprising a support, a hopper for particulate material on said support, and a rotatable spreader element beneath said hopper for broadcasting particulate material flowing thereonto from said hopper, said shield comprising a top wall spaced above said spreader element, an opening in said ton wall for material flowing from said hopper to said spreader element, said opening having an axis, a side wall extending downwardly from said top wall and peripherally thereabout between opposite ends circumferentially spaced apart to provide a discharge opening therebetween, said shield being rotatable in opposite directions about said axis, and means for selectively positioning said discharge opening in any one of a plurality of positions about said axis, said wall has a lower edge and includes a pair of circumferentially spaced apart stop elements extending below said edge, and said support includes an abutment for engaging with each stop element to limit rotation of said shield.

37. A shield for a vehicle mounted spreader comprising a support, a hopper for particulate material on said support, and a rotatable spreader element beneath said hopper for broadcasting particulate material flowing thereonto from said hopper, said shield comprising a top wall spaced above said spreader element, an opening in said ton wall for material flowing from said hopper to said spreader element, said opening having an axis, a side wall extending downwardly from said top wall and peripherally thereabout between opposite ends circumferentially spaced apart to provide a discharge opening therebetween, said shield being rotatable in opposite directions about said axis, and means for selectively positioning said discharge opening in any one of a plurality of positions about said axis, said hopper includes a discharge sleeve and said top wall includes a circular collar coaxial with said axis and receiving said sleeve, and means interengaging said sleeve and said collar in any one of a plurality of angular positions therebetween.

38. The shield according to claim 37, wherein said means interengaging said sleeve and collar includes a spring biased ball on one of said collar and said sleeve and a plurality of circumferentially adjacent recesses on the other of said collar and sleeve.

39. The shield according to claim 38, wherein said spring biased ball is on said collar.

40. A shield in association with a vehicle mounted rotatable spreader element comprising a support, said support includes a pair of straps and a motor mounting plate therebetween, the rotatable spreader element beneath an associated hopper for broadcasting particulate material flowing thereonto from the hopper, the spreader element having an axis, said shield comprising a wall radially spaced from and extending eccentrically about said axis, said wall having opposite ends circumferentially spaced apart to provide a discharge opening therebetween, said wall is rotatable in opposite directions about said axis, and said wall is frictionally engaged with at least one said strap and said mounting plate for selectively positioning said discharge opening in any one of a plurality of positions about said axis.

41. A shield in association with a vehicle mounted rotatable spreader element comprising a support, the rotatable spreader element beneath an associated hopper for broadcasting particulate material flowing thereonto from the hopper, said shield comprising a top wall spaced above the spreader element, an opening in said top wall for material flowing from the hopper to the spreader element, said opening having an axis, a side wall extending downwardly from said top wall and peripherally thereabout between opposite ends circumferentially spaced apart to provide a discharge opening therebetween, said shield being rotatable in opposite directions about said axis, said side wall has a lower edge and includes a laterally outwardly extending flange, and a fastener interengaging said flange and said support for limiting rotation of said shield thereby selectively positioning said discharge opening in any one of a plurality of positions about said axis.

42. A shield in association with a vehicle mounted rotatable spreader element comprising a support, the rotatable spreader element beneath an associated hopper for broadcasting particulate material flowing thereonto from the hopper, said shield comprising a top wall spaced above the spreader element, an opening in said top wall for material flowing from the hopper to the spreader element, said opening having an axis, a side wall extending downwardly from said top wall and peripherally thereabout between opposite ends circumferentially spaced apart to provide a discharge opening therebetween, and said top wall includes a rear edge having an arcuate portion further defining said discharge opening.

43. A shield adapted to a vehicle mounted spreader element rotatable about an axis and having an associated hopper, said shield comprising a wall radially spaced from and extending eccentrically about said axis, said wall having opposite ends circumferentially spaced apart to provide a discharge opening therebetween, said wall is a side wall and said shield includes a top wall from which said side wall depends, said shield is rotatable about said axis, and means for selectively positioning said discharge opening in any one of a plurality of positions about said axis.

44. The shield according to claim 43, wherein said top wall further includes an opening, and said top wall tapers outwardly and downwardly relative to said opening.

45. The shield according to claim 43, wherein said discharge opening has an angular extent of between 140° and 160° with respect to said axis.

46. The shield according to claim 45, wherein said angular extent is about 153°.

47. The shield according to claim 43, wherein said wall has a lower edge and includes a pair of circumferentially spaced apart stop elements extending below said edge, and said means includes an abutment for engaging with each stop element to limit rotation of said shield.

48. The shield according to claim 43, wherein said side wall has a lower edge and includes a laterally outwardly extending flange, and said means for positioning said discharge opening includes means interengaging said flange and a support for limiting rotation of said shield.

49. The shield according to claim 43, wherein the hopper includes a discharge sleeve, said top wall including a circular collar coaxial with said axis and receiving said sleeve, and said means interengaging said sleeve and said collar in any one of a plurality of angular positions therebetween.

* * * * *

UNITED STATES PATENT AND TRADEMARK OFFICE
CERTIFICATE OF CORRECTION

PATENT NO.   : 6,793,154 B2
DATED        : September 21, 2004
INVENTOR(S)  : James A. Kost It is certified that error appears in the above-identified patent and that said Letters Patent is hereby corrected as shown below:

Column 7,
Line 57, delete "too" and insert -- top --.

Column 10,
Lines 37 and 47, delete "too" and insert -- top --.

Column 11,
Lines 28 and 47, delete "ton" and insert -- top --.

Signed and Sealed this

Nineteenth Day of April, 2005

JON W. DUDAS
*Director of the United States Patent and Trademark Office*